United States Patent
Rudder et al.

(10) Patent No.: US 6,381,502 B1
(45) Date of Patent: Apr. 30, 2002

(54) VIRTUAL TOOL BOX FOR USE WITH INDUSTRIAL CONTROL SYSTEM

(75) Inventors: Michael W. Rudder, Euclid; Robert J. Kretscmann, Bay Village, both of OH (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/175,011

(22) Filed: Oct. 19, 1998

(51) Int. Cl.[7] ............................................... G05B 19/18
(52) U.S. Cl. .................... 700/2; 700/3; 700/9; 700/17; 700/83; 700/19; 709/217; 709/220; 713/201; 713/202; 710/129; 710/131; 710/110
(58) Field of Search ............................... 700/2, 3, 4, 9, 700/10, 11, 12, 17, 83, 19, 20; 710/129, 131, 132, 110; 713/201, 202; 709/1, 217, 220

(56) References Cited

U.S. PATENT DOCUMENTS

| 5,420,578 | A | * | 5/1995 | O'Brien et al. | ........ 340/870.13 |
| 5,808,885 | A | * | 9/1998 | Dew et al. | ...................... 700/2 |
| 5,808,886 | A | * | 9/1998 | Suzuki | ........................... 700/3 |
| 5,923,557 | A | * | 7/1999 | Eidson | ......................... 700/48 |
| 5,975,737 | A | * | 11/1999 | Carter et al. | .................... 700/4 |
| 6,047,222 | A | * | 4/2000 | Burns et al. | ................... 700/79 |
| 6,061,603 | A | * | 5/2000 | Papadopoulos et al. | ........ 700/83 |

* cited by examiner

*Primary Examiner*—Paul P. Gordon
*Assistant Examiner*—Ramesh Patel
(74) *Attorney, Agent, or Firm*—Keith M. Baxter; John J. Horn; William R. Walbrun

(57) ABSTRACT

An industrial control system incorporating a plurality of human/machine interfaces provides for the identification of an operator using the human/machine interface so as to forward output from an ongoing application tool program to the operator as the operator moves about the factory without interruption of the tool program. Location of the human/machine interface may be used to alter the tool program to refer to data relevant to the particular part of the process near the HMI providing for intuitive and efficient use of software type tools by roving operators.

11 Claims, 5 Drawing Sheets

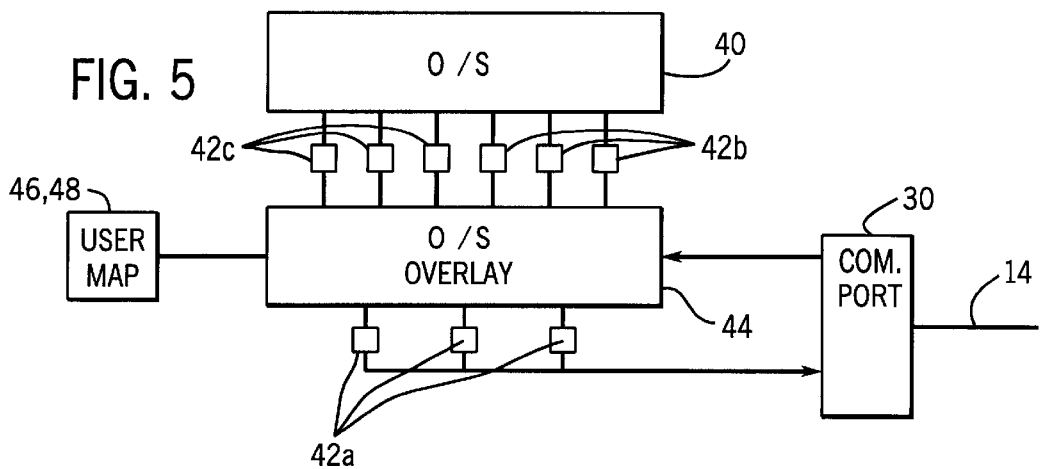
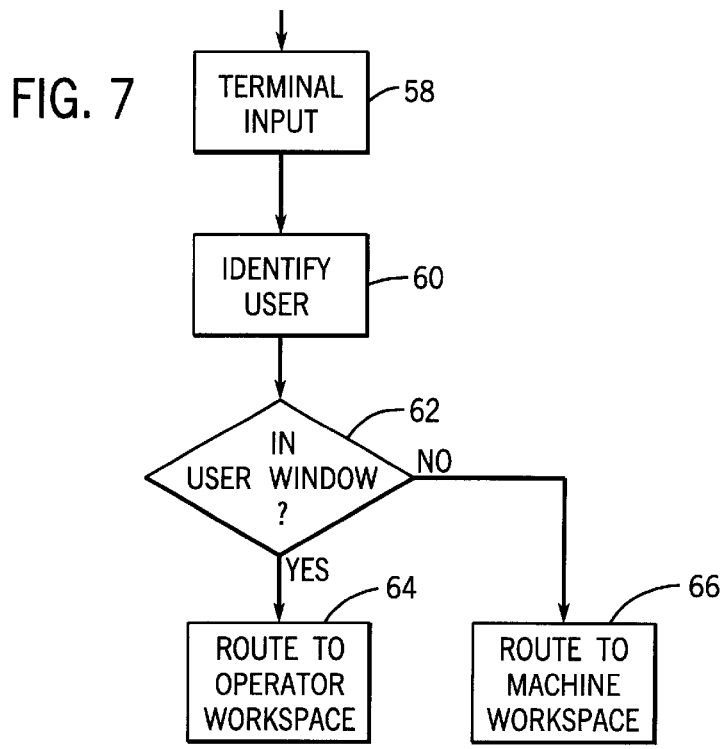

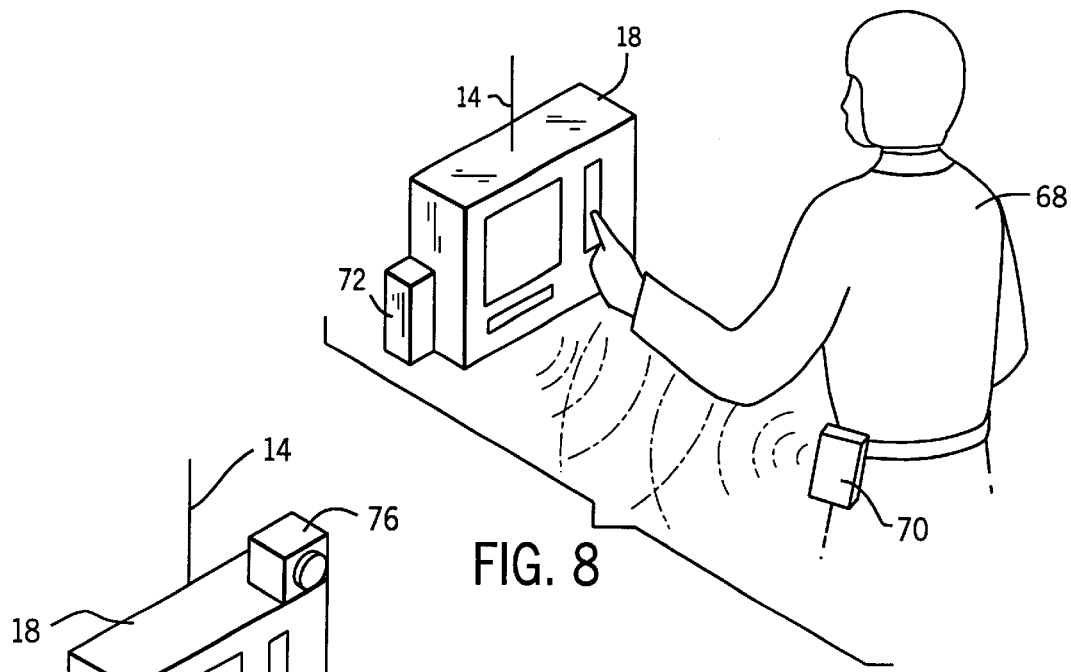
FIG. 8
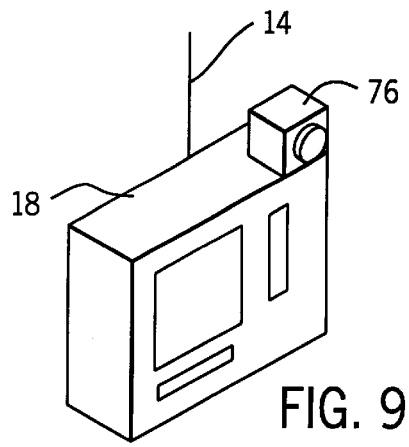
FIG. 9
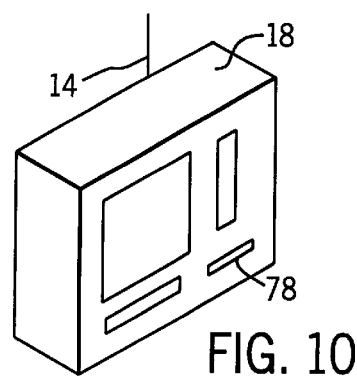
FIG. 10
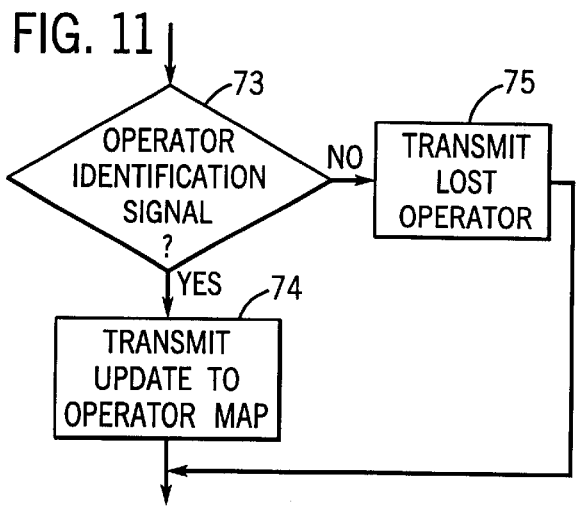
FIG. 11
FIG. 12

VIRTUAL TOOL BOX FOR USE WITH INDUSTRIAL CONTROL SYSTEM

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to industrial control systems and in particular to an operator interface used in industrial control systems.

Industrial controllers are special purpose computers used for controlling industrial processes or manufacturing equipment. Under the direction of a stored program, the industrial controller examines a series of inputs reflecting the status of the controlled process and changes outputs affecting the control of the process. The inputs and outputs are most simply binary, that is "on" or "off", however analog inputs and outputs taking on a continuous range of values are also used. The binary inputs and outputs may be represented by single bits of data, the analog inputs and outputs may be represented by multiple bit data words.

In one common architecture for industrial controllers, a central processor reads and writes input and output values from and to an I/O image table. The I/O image table in the controller collects the values of all inputs and outputs of the control system where they may be rapidly accessed by a control program, also executing on the central processor, without the need to be concerned with complex communication protocols used to exchange data directly with the I/O modules. Normally, separate circuitry operating asynchronously to the processor refreshes the I/O image table by communicating with one or more I/O modules in a scanning process. Thus, the I/O image table simplifies and speeds the execution of the control program.

The I/O modules may be distributed about a factory to be near the machinery with which they communicate and are joined to the central processor via a high speed network as is known in the art. Typically, also linked to the high speed network are one or more human/machine interfaces (HMIs) displaying the status of critical process variables to human operators. The HMI may be a display only, for example a plasma or LED panel, or an entire computer terminal and may allow both for the display of data and for input by a human operator. Input from the operator may be used to reprogram aspects of the particular piece of equipment or to communicate with the central processor.

In advanced control systems, an HMI may be associated with each machine or group of machines.

One advantage to an integrated control system employing a control network interlinking all machines and the central processor is that the process may be readily monitored from a single location. Nevertheless, as a practical matter, it is still desirable and necessary for human operators to tour the physical plant facilities for the purpose of process monitoring and during the installation or modification and troubleshooting of the control system. Traditionally, such operators carry with them test equipment such as voltmeters and the like, but increasingly, these are giving way to software tools run on a portable computer and connecting to the network. Such software tools are cumbersome to use requiring a computer to be carried about and requiring repeated input from the operator to direct the software tools to the relevant data associated with the particular machine.

What is needed is a more sophisticated software-type tool for industrial control systems providing the simplicity and intuitive nature of a voltmeter or other physical tool.

BRIEF SUMMARY OF THE INVENTION

The present invention provides one or more virtual software tools that may be accessed on the HMIs already distributed about a factory. The tools execute independent of the HMI under the control of a processor located arbitrary on the network.

In the preferred embodiment, each HMI includes means for passively identifying the presence of the operator in the vicinity of the HMI so as to send a signal to the processor executing the tool program to display the necessary information at the HMI where the operator is present. The operator may provide inputs through the HMI to interact with the tool and the tool program may automatically be configured to receive data relevant to the particular location where the operator is located.

Thus, the virtual tool may follow the operator about the factory from HMI to HMI without interruption in its operation or in the operation of the conventional duties of the HMI which may be performed in a background window or the like. That is, the tool application need not be restarted at each HMI. Further the tool may automatically connect itself to the local machines by identifying relevant data typically in the I/O table of the processor executing the tool program.

Specifically, the present invention provides an industrial control system for controlling the operation of a process executed on a plurality of machines distributed in a factory. The control system generally includes a data network, and a plurality of machine interface circuits joined by the data network providing output signals to the machines and receiving input signals from the machines, and a plurality of operator terminals, also on the data network, providing terminal outputs to human operator. The operator terminals have operator identification means for producing an operator identification signal identifying a human operator using, or in the proximity of, the operator terminal. An electronic computer communicates with the interface circuits and the operator terminals over the data network to execute a control program to read the input signals from the machine interface circuits and to generate output signals to the machine interface circuits based on the input signals and the control program. The electronic computer further executes a tool program based on received operator identification signals to generate first terminal outputs. Finally, the computer executes a routing program to redirect first terminal outputs to a particular operator terminal with movement of the operator to the particular operator terminal as indicated by the operator identification signals without interruption of the execution of the tool program.

Thus, it is one object of the invention to provide a virtual tool box of one or more software programs that may follow an operator about in a factory environment without interruption of the execution of the tool program such as would interrupt the operator's work flow.

The electronic computer may hold a number of operator programs related to different classes of operators and the operator identification signal may be used to designate a particular operator program for execution based on a known class of the operator.

It is yet another object of the invention to allow custom tool boxes to be identified to particular operators so that the appropriate tools are displayed on a given HMI depending on the role assigned to the individual. In this way, a suite of appropriate applications may follow an operator about the factory.

The electronic computer may further execute a machine program to generate second terminal outputs based on machine interface signals related to a given machine associated with a particular operator terminal. The routing program also directs the second terminal outputs to the particular operator terminal. The first terminal outputs and second terminal outputs may be displayed on the particular operator terminal as separate portions of an operator terminal display screen. Each portion of the display may operate in a separate window as is understood in the art.

Thus, it is yet another object of the invention to allow dual use of the HMIs about the factory floor, both for their traditional status reporting tasks and to support the tool programs of the present invention.

The particular operator terminal may be associated with a given machine and the tool program may produce first terminal outputs to the particular operator terminal based on signals of the machine interface circuit associated with the given machine.

Thus, it is yet another object of the invention to allow both seamless transition of tool programs between HMIs distributed about the factory and to further facilitate the use of software tools that require particular machine associated data, based on the context of their use. Thus, for example, just as a voltmeter accepts arguments of the voltages of a particular machine near the operator, tool programs may automatically take as their arguments data associated with the machine at hand rather than the process as a whole.

The tool program may also produce the first terminal outputs to the particular operator terminal based on portions of the control program associated with the given machine.

Thus, it is another object of the invention to provide a convenient tool for use by programmers allowing them to view relevant code associated with the machine they are near.

The foregoing and other objects and advantages of the invention will appear from the following description. In this description, references are made to the accompanying drawings which form a part hereof, and in which there are shown by way illustration, the preferred embodiment of the invention. Such embodiment does not necessary represent the full scope of the invention, however, and reference must by made therefore to the claims for interpreting the scope of the invention.

BRIEF DESCRIPTION OF THE SEVERAL VIEWS OF THE DRAWINGS

FIG. 5 is a detailed representation of the operating system and overlay of FIG. 2 showing implementation of the work spaces of FIG. 3 using a conventional multi-operator operating system together with an operating system overlay and router;

FIG. 6 is a diagram of a table as held in the memory of the processor of FIG. 2 associating an operator's location independent work space with a physical work space of one of the HMIs of FIG. 1;

FIG. 7 is a flow of the steps performed by the processor of FIG. 2 in generating the combined work space of FIG. 3;

FIG. 8 is a perspective view of an operator using an HMI of FIG. 1 and passively identified by means of a badge worn by the operator;

FIG. 9 is an alternative embodiment of FIG. 8 where the operator identification unit is a camera for viewing the operator's face to recognize the operator;

FIG. 10 is an alternative embodiment of FIG. 8 wherein the operator is identified by means of a badge reader incorporated into the HMI;

FIG. 11 is a flow chart showing the steps executed by the HMI of FIGS. 8 through 10;

FIG. 12 represents a task table as may be held in the memory of the processor of FIG. 1 allowing identification of a task for execution on a given HMI based both on the identity of the operator and the location of the HMI;

DETAILED DESCRIPTION OF THE INVENTION

Figure 1:
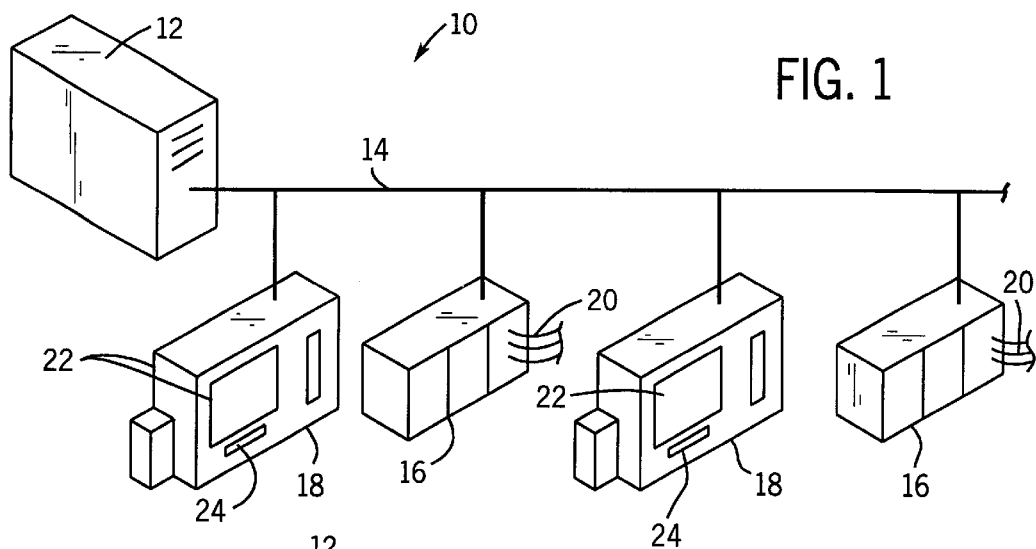
FIG. 1 is a simplified perspective representation of an industrial control system suitable for practice of the present invention showing a central processor connected by a data network to I/O modules and human/machine interface terminals having operator identification units.

Referring now to FIG. 1, an industrial control system 10 may employ a central controller 12 communicating on a high speed data network 14 with one or more remote I/O modules 16 and one or more human/machine interfaces (HMI) 18.

The remote I/O modules 16 provide termination for one or more electrical leads 20 which may be connected to machinery to be controlled to output command signals to those machines (not shown) or receive input signals from those machines. These signals are collected by the I/O modules 16 and transmitted on the data network 14 to the central controller 12 where, based on those input signals and the control program, output signals are generated and transmitted in turn to the I/O module 16. Generally, the I/O modules 16 are distributed about the factory near the machines which they control.

The HMIs 18 communicate similarly with the central controller 12 over the data network 14 to receive terminal output signals such as may be images or text displayed on displays 22, and to accept terminal input signals via keyboards 24, from a human operator, that in turn may be transmitted to a program running on the central controller 12.

Figure 2:
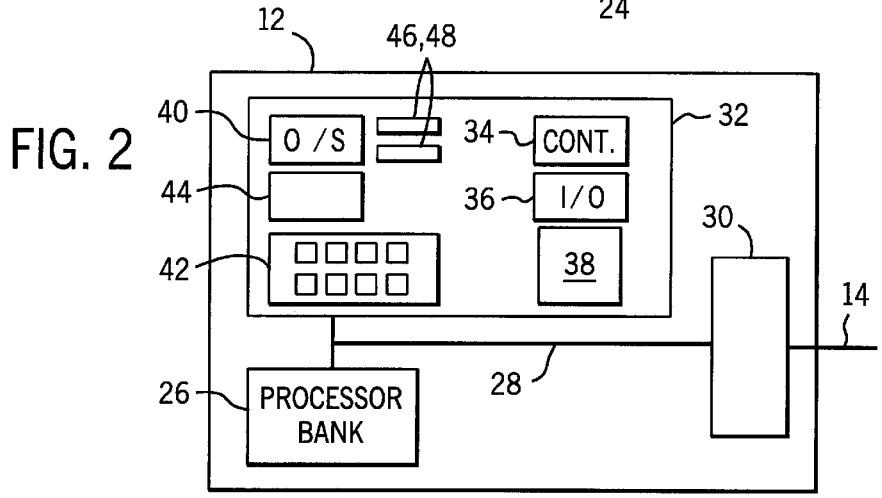
FIG. 2 is a block diagram of the components of the central processor of FIG. 1 showing a memory holding a control program, an I/O data table, application programs including tool and control programs, as well as an operating system and an overlay used in the present invention to define location independent work spaces.

Referring now also to FIG. 2, the central controller 12 may include a processor bank 26 communicating on an internal bus 28 with a communication module 30, the latter providing a communication pathway to the data network 14. Also attached to the bus 28 is a memory 32 holding a control program 34 and an I/O table 36. I/O table 36 is used to store the various input and output signals communicated between the central controller 12 and the controlled machinery via the I/O modules 16. The memory 32 may also hold one or more application programs 38 including those which produce the outputs to the HMIs 18 and which receive inputs therefrom, as well as tool programs, as will be described.

The memory 32 may also includes an operating system 40, such as allows the central controller 12 to execute multiple tasks using different work spaces 42, as is generally understood in the art. On overlay program 44, as will be described below, works in conjunction with the operating system 40 and one or more tables 46 to implement the present invention.

Figure 3:
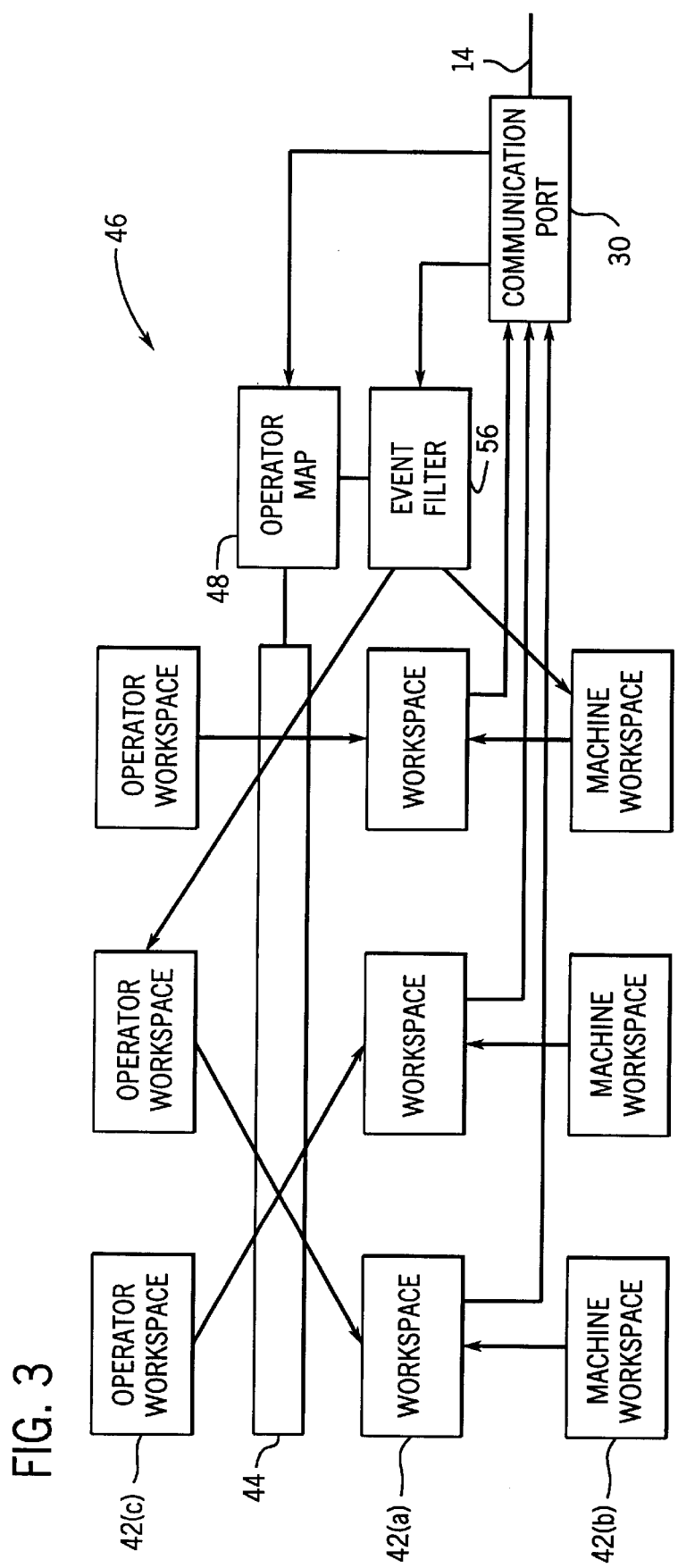
FIG. 3 is a block diagram of location-independent work spaces of the present invention as assigned to particular operators and as related to physical work spaces associated with the HMIs of FIG. 1 by the present invention.

Referring now to FIGS. 3 and 5, the present invention provides for three distinct work spaces 42. The first are conventional workspaces 42a each associated with a particular HMI 18 on the network and output buffers for communicating with the keyboard 24 and display 22 of the HMI 18, respectively, as well as memory associated with particular applications being run by the HMI 18. Each workspace 42a is assigned a unique address associating it with a single HMI 18. The use of different workspaces 42a associated with physical devices such as the HMI 18 is generally understood in the art.

The present invention also provides for machine virtual workspaces 42b one associated with each HMI 18 and holding the input buffer and the variables associated with instances of application programs running in that workspace for one HMI 18. Thus together workspace 42a and 42b provides a complete workspace for the HMIs 18 usable by the operating system to support the HMIs 18.

The present invention also provides a set of operator virtual workspaces 42c providing input buffering, output buffering and storage of application program variables for tool programs run by particular human operators. Whereas workspaces 42a and 42b are always linked to each other in fixed arrangement, workspaces 42c may be linked to workspaces 42a in an arbitrary manner as determined by an operator map 48.

Each of the programs associated with the workspaces 42a through 42c may be run as individual tasks in a multi-tasking mode on the operating system. Generally outputs from the operator virtual workspaces 42c and the machine virtual workspaces 42b are combined by an overlay program 44 to form an output of workspace 42a which is then communicated by a communication module 30 to the data network 14. There it is transmitted to one or more HMIs 18. The rule for the combination of workspaces is that output data for the virtual operator workspaces 42c is initially positioned in front of output data from the machine virtual workspaces 42b according to standard windowing protocols understood in the art.

Figure 4:
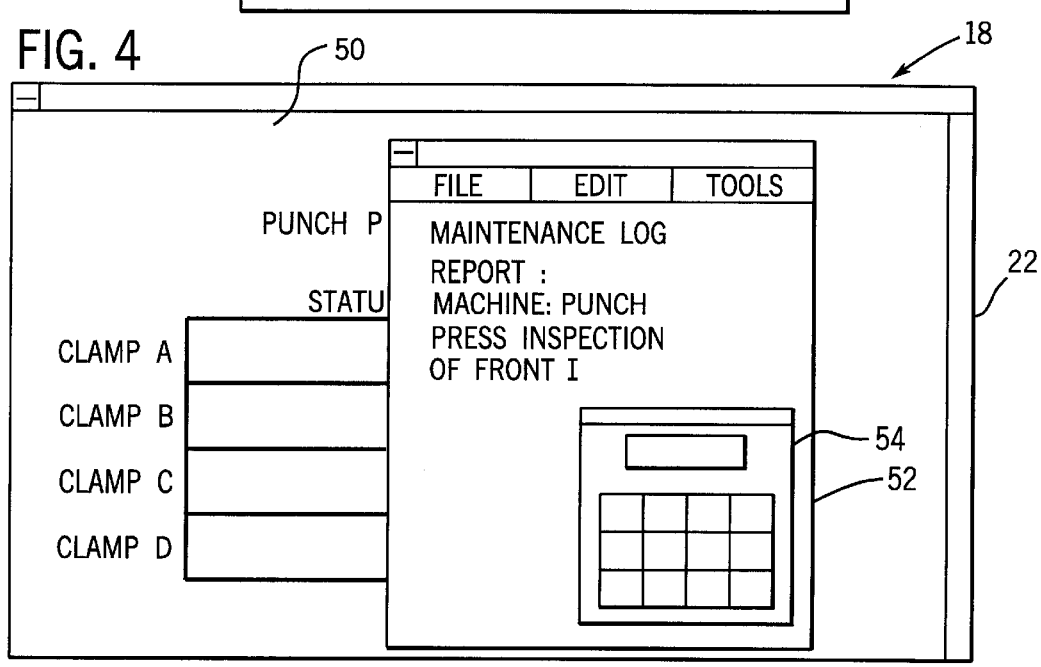
FIG. 4 is a view of the screen of an HMI of FIG. 1 showing a combination display of the location independent work space and a location dependent work space produced by the present invention.

Thus referring to FIG. 4, a display 22 of one HMI 18 will include first background window 50 generated by the machine virtual workspace 42b having overlayed on top of it an output 52 generated by a operator virtual workspace 42c. According to conventional techniques, the operator virtual workspace 42c and the machine virtual workspace 42b may both have additional layers of applications also represented by windows, for example, a window 54 within the output 52.

The size and location of the windows are stored in the respective workspaces 42c and 42b as properties of window objects. These properties are read by an event filter 56 which receives "events" from the communication module 30 as transmitted over data network 14 from an HMI 18. Such events may be, for example, key presses on the HMI keyboard 24 or for HMI 18s that use cursor control devices, a "mouse-click" type event indicating a click and a cursor located within a window 52 or elsewhere on the display 22. Based on knowledge of the size of the windows read by the event filter 56 from the properties in the various operator virtual workspaces 42c and in particular the size of window 52 and based on the knowledge of the mapping between workspaces 42c and 42a obtained from the operator map 48, the event filter 56 directs these events to the proper workspace programs so that the programs in workspaces 42b may co-exist with the programs in the workspaces 42c.

Referring now to FIG. 7, the operation of the event filter 56 begins with an event, e.g., a terminal input indicated by process block 58 where a keyboard 24 on an HMI is activated. The event filter 56 operating on the central controller 12 then identifies the human operator associated with the particular HMI at process block 60 by reference to the operator map 48. The identification of the human operator will be described further below. At decision block 62, the event filter 56 determines whether the input is associated with the operator window 52 or the background window 50 of the HMI 18 according to conventional focus rules used in graphical interface design. If the event occurred with respect to the operator window 52, then at process block 64, the event is routed to the particular operator workspace 42c associated with the human operator identified in process block 60. On the other hand, if the event is associated with the background window 50, then the event is routed to a machine workspace 42b according to process block 66.

Referring now to FIG. 5, the operating system 40 manages the workspaces 42b and 42c and the overlay program as separate tasks and the overlay program 44 is used to combine these workspaces according to the operator map 48. The combined workspace 42a is then forwarded to the appropriate HMI 18 on data network 14 via the communications port 30. Accordingly the work of combining virtual workspaces into actual workspaces and the operator filtering described above may be segregated into an overlay 44 to work within the context of a conventional multi-tasking operating system.

Referring again to FIGS. 3 and 8 the operator map 48 which controls the mapping of operator workspaces 42c to physical workspaces 42a is generated by operator identification signals obtained by the various HMIs 18. In the first embodiment, a operator 68 may wear an RF tag 70 that may be interrogated by an RF tag reader 72, such as are known in the art, when the operator 68 is close enough to the HMI 18 to use it. This operator identification signal is sent along the data network 14 to be received by the operator map 48 and associated with an address of the particular HMI 18 transmitting the signal to update the operator map 48 of FIG. 6.

Referring to FIG. 11, the HMI 18 generally executes as part of its internal programming, a loop having a decision block 73 checking for an operator identification signal from RF tag reader 72 and if a signal exists transmitting that fact as indicated by process block 74 to the central controller 12 together with the identity of the human operator, and if not as indicated by process block 75, transmitting the fact that no operator is present.

In an alternative embodiment, shown in FIG. 9, the RF tag reader 72 may be replaced with a camera 76 and the present signal may be derived from software used to identify features of the operator 68.

As shown in FIG. 10 as yet another alternative, a card reader 78 may be incorporated into the HMI 18 to read a standard credit card type badge. Alternatively, the operator may enter keystrokes identifying his or her presence. Other methods of identifying an operator both as to location and identity may be readily substituted in this application including fingerprint readers, hand scanners and the like.

Referring now to FIG. 12, in yet another alternative embodiment, the operator map 48 may be supplemented by a task table 80 mapping human operators and locations of particular HMI 18 as linked by the operator map 48 of FIG. 6 to tasks being combinations of application programs and/or data. Thus, for example, a first operator when at address 1 of a particular HMI 18 may desire a first task representing a tool program 38 of FIG. 2 while the same operator at address 3 of a different HMI 18 may request a third task program. This relationship between operator's locations and tasks may be preprogrammed into the central controller 12.

The task table may also link operators to function codes indicating the role of the operator in the factory to tailor the tasks to the operators needs, for example as a maintenance technician, as opposed to a control engineer.

Generally the tasks may include machine independent tasks. For example, task 1 may be a simplified word processor which may follow the operator about to collect and edit notes from the operator. In this case, the application program remaining open to the particular page where data is being entered as the operator moves among locations occupied by different HMIs 18. Task 3 on the other hand may represent an entirely different program, for example, an HMI screen configuration program.

Alternatively, tasks 1 and 3 may be the same program associated with different data, for example a logic analyzer program linked to the data of the machines of a first HMI 18, at address 1, but then at address 3 linked to the data of a different machine associated with a different HMI 18.

Figure 13:
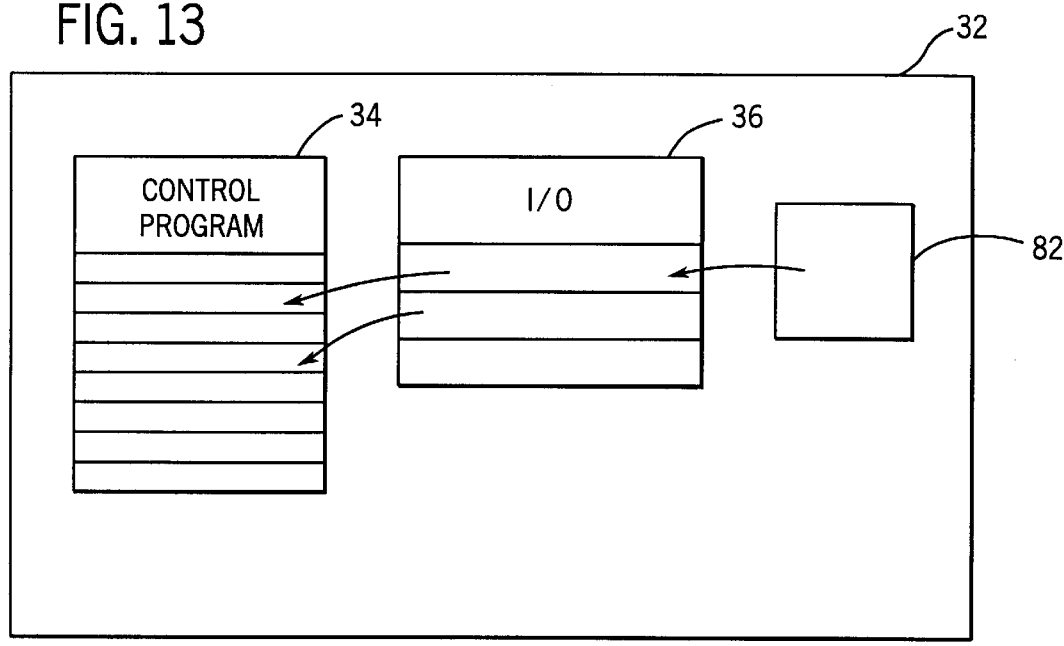
FIG. 13 is a graphical representation of a pointer table used for identifying particular data relevant to an HMI for use with the tasks of FIG. 12.

Referring to FIG. 13, data may be identified to particular HMIs 18 by means of an association table 82. Generally association table 82 provides a listing of machines associated with a particular address or HMI 18. The association table 82 then points to particular I/O data in I/O table 36 associated with those machines from which lines of code in the control program 34 invoking that I/O data may be identified. These links may be established manually or may be performed by identifying the address of the I/O data and automatically identifying portions of the control program 34.

Figure 14:
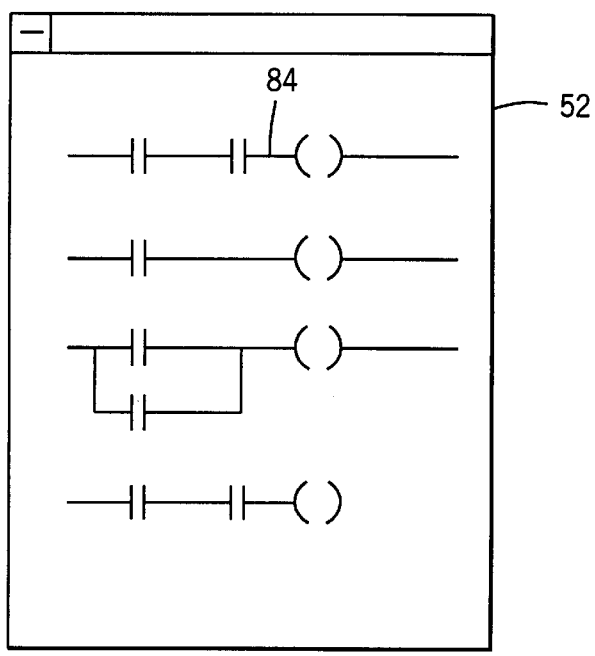
FIG. 14 is a FIG similar to that of FIG. 4 showing representation of a portion of control programming code associated with a machine near a particular HMI such as may be used for troubleshooting.

Referring to FIG. 14, then, the operator window 52 may include portions 84 of the control program 34 associated with the machines near the HMI 18. This can be useful in reviewing the program executed by the control system because it associates portions of the program with particular machines and spatial locations. A programmer may observe both the I/O data and the portions of the control program 34 associated with those machines while observing the actual machine at the HMI itself.

The above description has been that of a preferred embodiment of the present invention. It will occur to those who practice the art that many modifications may be made without departing from the spirit and scope of the invention. It will be understood, for example, that the particular elements of the present invention as realized in software need not be located at a particular device but may be located in their entirety or in different portions in different computing devices interconnected on the data network 14 according to distributed processing conventions well known in the art. In order to apprise the public of the various embodiments that may fall within the scope of the invention the following claims are made.

We claim:

1. An industrial control system for controlling the operation of a process executed on a plurality of spatially separate machines, the control system comprising:

a data network;

a plurality of interface circuits connected to the data network and proximate to ones of the machines, the interface circuits providing output signals to the machines and receiving input signals from the machines;

a plurality of operator terminals connected to the data network and proximate to ones of the machines, the interface circuits providing operator outputs to a human operator and receiving operator inputs from a human operator, the operator terminals further having operator identification means for producing an operator identification signal identifying a proximate human operator;

an electronic computer communicating with the interface circuits and the operator terminals via the data network and (i) executing a control program to read the input signals from the interface circuits and to generate the output signals to the interface circuits based on the input signals and associated portions of the control program;

(ii) executing an operator program to generate data for the operator outputs;

(iii) execute a routing program to direct the data for the operator outputs to particular operator terminals based on the operator identification signals without interruption of the execution of the operator program;

whereby an operator program may seamlessly follow a human operator about the factory.

2. The industrial control system of claim 1 wherein the operator program accepts as arguments a portion of the input and output signals associated with a machine, and wherein the operator terminals further produce a machine identification signal identifying a given machine proximate to the operator terminal and wherein the electronic computer routes operator outputs from the operator program using as an argument the portion of the inputs and outputs of the given machine.

3. The industrial control system of claim 1 wherein the operator program accepts as arguments a portion of the control program associated with a machine, and wherein the operator terminals further produce a machine identification signal identifying a given machine proximate to the operator terminal and wherein the electronic computer routes operator outputs from the operator program using as an argument the portion of the control program associated with the given machine.

4. The industrial control system of claim 1 wherein the operator program also accepts as arguments the operator inputs.

5. The industrial control system of claim 1 wherein the electronic computer executes a number of operator programs associated with different operators and wherein the routing program direct the operator outputs for each of the operator programs to particular operator terminals based on the operator identification signals from the different operators without interruption of the execution of the operator programs.

6. The industrial control system of claim 1 wherein the control program further provides outputs to the operator terminal and wherein a display area of the operator is split to display in a first portion the outputs from the control program and in a second area the outputs from the operator program.

7. The industrial control system of claim 1 wherein the electronic computer holds a number of operator programs associated with different classes of operators and wherein the routing program direct the operator outputs to the operator terminals based on the operator identification signals as related to a class of operators.

8. The industrial control system of claim 1 wherein the operator identification means is a passive operator identification system recognizing innate characteristics of the operator.

9. The industrial control system of claim 8 wherein the passive operator identification means is selected from the group consisting of: voice recognition, face recognition and fingerprint recognition.

10. The industrial control system of claim 1 wherein the operator identification means is a tag reader reading a unique tag on the person of the operator.

11. The industrial control system of claim 1 wherein the tag is selected from the group consisting of a barcode encoded tag, a passive RF tag, a magnetic strip encoded tag.

* * * * *